UNITED STATES PATENT OFFICE.

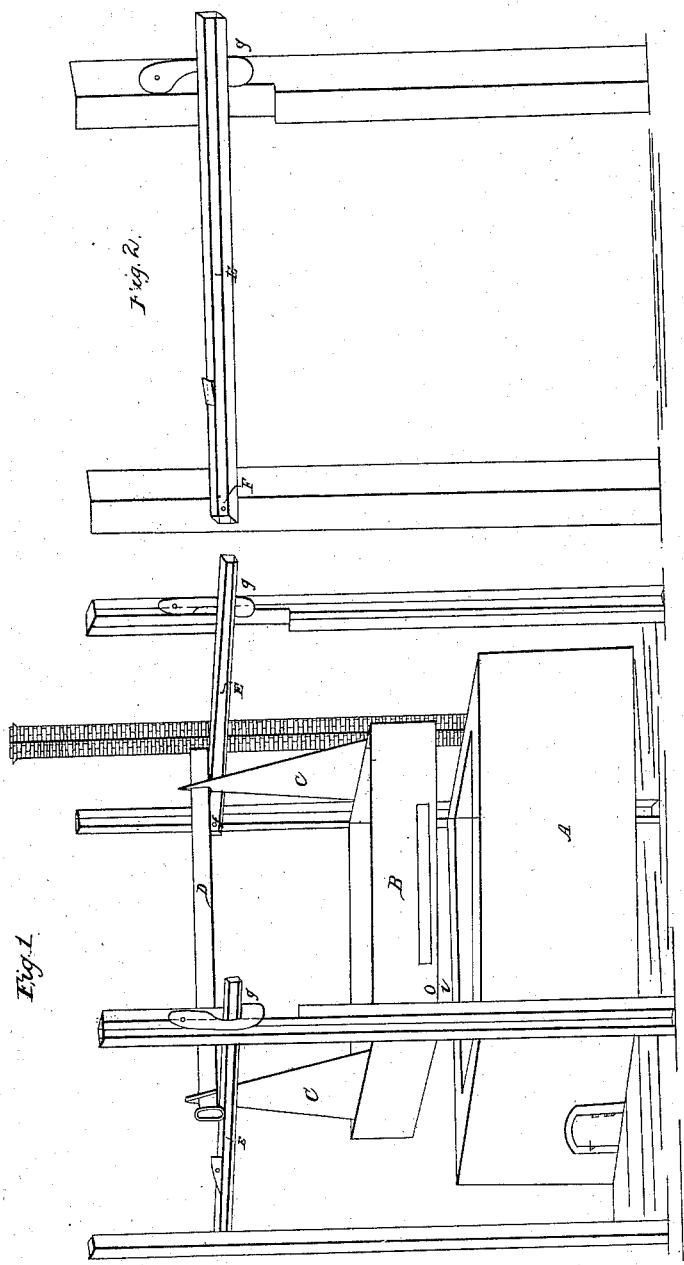

SAMUEL HEATON, OF KINGSTON, IOWA.

IMPROVED SORGHUM-EVAPORATOR.

Specification forming part of Letters Patent No. 48,397, dated June 27, 1865.

*To all whom it may concern:*

Be it known that I, SAMUEL HEATON, of Kingston city, in the county of Linn and State of Iowa, have invented a new and useful Improvement in Sorghum-Evaporators; and I do hereby declare that the following is a full, clear, and exact description of the construction and operation of the same, reference being had to the annexed drawings, making a part of this specification, in which—

Figure 1 is a perspective view, and Fig. 2 is a sectional view, thereof.

The letter A represents a furnace, over which the juice or sap is boiled. B is the pan that holds the juice or sap. C C are upright arms, attached to the pan at their lower ends and to a cross-bar at their upper ends. D is a cross-bar resting on two levers. E E are two levers, upon which the cross-bar rests. They are fastened at one end to a post or other fixture by bolts $ff$, upon which they may be turned so as to allow their opposite ends to be raised or lowered at will. The ends of these levers are raised or lowered at will in grooves or niches formed for that purpose on the sides of upright posts, and are held in position when raised by means of the hooks $g\,g$, or they may rest on the lower ends of the grooves or niches in the posts.

In one corner of the pan B, I place a plug, represented by $i$, for the purpose of drawing off the contents of the pan.

I may make both ends of the cross-bar D where it rests upon the levers either flat or round, but I prefer to have one end flat and the other round, as represented in the drawings.

The mode of operating my apparatus is as follows: I place both levers down or off from the hooks $g\,g$, by which movement the pan is lowered to the top of the furnace and rests upon it, closing the upper face of the same and creating additional draft for the fire. I then fill the pan with juice or sap, and boil it down to sirup. To remove the pan from the fire, I raise the front end of both levers and fasten them up on the hooks $g\,g$. I next slide the cross-bar D on the levers toward the front posts until I have removed the pan as far from the fire as may be desirable. To remove the contents of the pan when the same is boiled down to sirup or sugar, I drop that lever from the hook which is on the same end of the pan as the plug, and let it rest on the lower end of the niche or groove. By this movement the contents flow to that end of the pan in which the plug is placed, and are easily drawn off. When the pan is emptied I replace the plug and restore the lever to its place upon the hook. I then slide the cross-bar to its position above the furnace, refill the pan with juice, and proceed as before stated.

The advantage of my invention is that by means thereof one person can easily and almost instantly remove a large pan from the furnace by raising the front ends of the levers and placing them on the hooks, thereby lessening in a great measure the losses incurred by boiling over and burning so common to all other apparatus heretofore used.

By means of my invention one man can easily remove a pan from the furnace that is ten feet in length and two-and-a-half feet in width, and filled with juice, without danger of spilling the contents or of injuring the furnace by dragging down its sides. The pan becomes easily movable, while at the same time it is made to sit closely on the furnace, if desired, with all the advantages of a fixture thereto.

By means of the levers the pan can be kept at just that distance from the fire the operator may choose, and any degree of heat secured thereby which he may consider best for his purposes.

What I claim as new, of my invention, and desire to secure by Letters Patent, is—

1. The levers E E, constructed in the manner and for the purposes specified, substantially as set forth.

2. The cross-bar D, constructed in the manner and for the purposes specified, substantially as described.

3. The swinging-hooks $g\,g$, constructed in the manner and for the purposes specified, substantially as described.

4. In combination with an evaporator, the levers E E, the cross-bar D, and the hooks $g\,g$, constructed and operated substantially as and for the purposes herein specified.

SAMUEL HEATON.

Witnesses:
 J. C. SMITH,
 J. K. SOMES.